(12) United States Patent
Battle

(10) Patent No.: US 12,361,104 B2
(45) Date of Patent: Jul. 15, 2025

(54) CIRCUMFERENCE BASED BIOMETRIC AUTHENTICATION

(71) Applicant: Selfiecoin, Inc., Brooklyn, NY (US)

(72) Inventor: Sharron Battle, Las Vegas, NV (US)

(73) Assignee: Selfiecoin, Inc., Brooklyn, NY (US)

( * ) Notice: Subject to any disclaimer, the term of this patent is extended or adjusted under 35 U.S.C. 154(b) by 499 days.

(21) Appl. No.: 17/642,580

(22) PCT Filed: Sep. 11, 2020

(86) PCT No.: PCT/US2020/050293
§ 371 (c)(1),
(2) Date: Mar. 11, 2022

(87) PCT Pub. No.: WO2021/050803
PCT Pub. Date: Mar. 18, 2021

(65) Prior Publication Data
US 2022/0342967 A1    Oct. 27, 2022

Related U.S. Application Data

(60) Provisional application No. 62/898,805, filed on Sep. 11, 2019.

(51) Int. Cl.
*G06F 21/32* (2013.01)
*G06V 10/10* (2022.01)
(Continued)

(52) U.S. Cl.
CPC .............. *G06F 21/32* (2013.01); *G06V 10/17* (2022.01); *G06V 40/168* (2022.01);
(Continued)

(58) Field of Classification Search
None
See application file for complete search history.

(56) References Cited

U.S. PATENT DOCUMENTS 10,108,792 B2   10/2018   Hou et al.
10,311,300 B2 *  6/2019   Teverovskiy ........ G06V 40/193
(Continued)

FOREIGN PATENT DOCUMENTS

JP      2015026317 A     2/2015
KR   1020140138991 A    12/2014
KR       101806028      12/2017

OTHER PUBLICATIONS

Extended European Search Report in European Appln No. 20863696.9, dated Aug. 18, 2023, 11 pages.
(Continued)

*Primary Examiner* — Tahmina N Ansari
(74) *Attorney, Agent, or Firm* — Fish & Richardson P.C.

(57) ABSTRACT

Methods, systems, and apparatus, including computer programs encoded on a computer storage medium, for enhancing biometric authentication are disclosed. According to a method, A circumferential biometric template (CBT) of a particular entity is generated based on one or more images of the particular entity. A request to access an item is received wherein the request includes an identifier corresponding to the particular entity. Circumferential biometric data (CBD) for one or more physical characteristics of an entity depicted in an image captured by an image capture device is obtained, Authentication outcome data indicating whether the CBD matches the CBT of the particular entity is generated. Access to the item is granted when the authentication outcome data indicates that the CBD matches the CBT of the particular entity. Access to the item is denied when the authentication outcome data indicates that the CBD fails to match the CBT of the particular entity.

20 Claims, 5 Drawing Sheets

(51) Int. Cl.
*G06V 40/16* (2022.01)
*G06V 40/50* (2022.01)

(52) U.S. Cl.
CPC .......... *G06V 40/171* (2022.01); *G06V 40/172* (2022.01); *G06V 40/50* (2022.01); *G06F 2221/2111* (2013.01); *G06F 2221/2141* (2013.01); *G06V 40/53* (2022.01)

(56) References Cited

U.S. PATENT DOCUMENTS

| | | | |
|---|---|---|---|
| 2009/0214087 A1 | 8/2009 | Hsueh | |
| 2010/0272328 A1 | 10/2010 | Lee | |
| 2014/0165187 A1 | 6/2014 | Daesung | |
| 2015/0012742 A1 | 1/2015 | Gorelik | |
| 2017/0337424 A1* | 11/2017 | Teverovskiy | G06F 21/32 |
| 2018/0181737 A1 | 6/2018 | Tussy | |
| 2020/0186535 A1* | 6/2020 | Naik | H04L 63/105 |
| 2022/0342967 A1* | 10/2022 | Battle | G06V 40/171 |

OTHER PUBLICATIONS

International Preliminary Report on Patentability in International Appln. No. PCT/US2020/050293, mailed on Mar. 24, 2022, 6 pages.

Authorized officer Kim, Sung Hee, PCT Search Report and Written Opinion of PCT/US2020/050293, mailed Dec. 21, 2020, 10 pages.

* cited by examiner

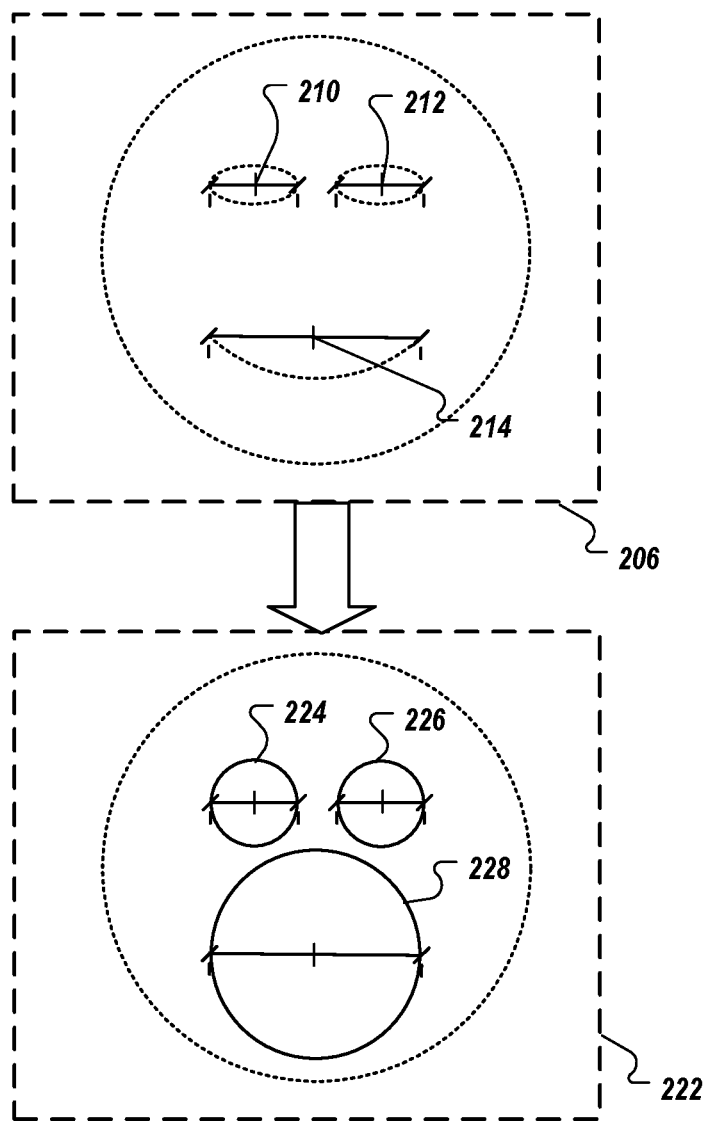
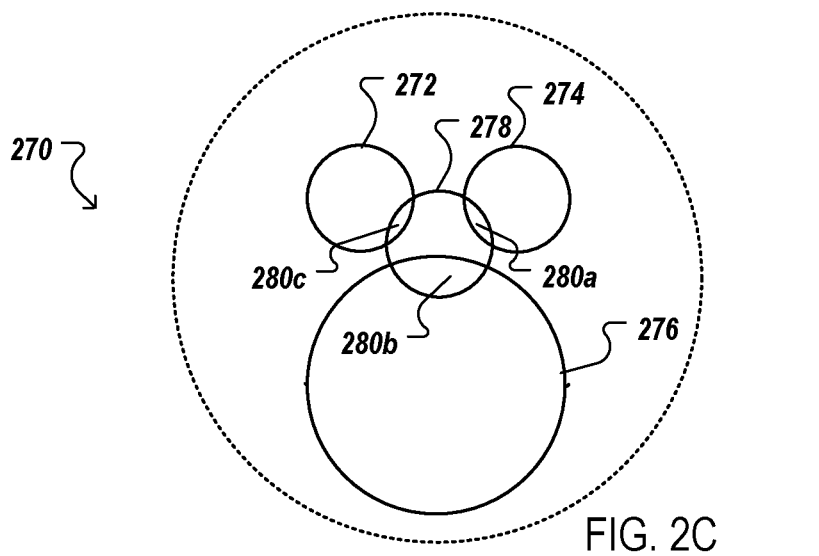
FIG. 2B
FIG. 2C

CIRCUMFERENCE BASED BIOMETRIC AUTHENTICATION

CROSS-REFERENCE TO RELATED APPLICATIONS

This application is a national stage application under 35 U.S.C. § 371 of PCT International Application No. PCT/US2020/050293, filed Sep. 11, 2020, which claims the benefit of priority under 35 U.S.C. § 119 (e) to U.S. Provisional Application No. 62/898,805 filed Sep. 11, 2019. These documents are incorporated herein by reference.

BACKGROUND

This specification relates to biometric authentication.

Biometric authentication refers to a security process that uses biological characteristics of a person to verify their identity. Some conventional techniques for performing biometric authentication include verifying identify using fingerprints, voice identification, and retinal scans.

SUMMARY

In general, one innovative aspect of the subject matter described in this specification can be embodied in methods that include the actions of generating, by one or more servers, a circumferential biometric template (CBT) of a particular entity based on one or more images of the particular entity; storing, by the one or more servers and in a data structure, the CBT with a reference to the particular entity; after storing the CBT with the reference to the particular entity: receiving a request to access an item, wherein the request includes an identifier corresponding to the particular entity; obtaining circumferential biometric data (CBD) for one or more physical characteristics of an entity depicted in an image captured by an image capture device; generating authentication outcome data indicating whether the CBD matches the CBT stored with the reference to the particular entity; and controlling access to the item based on the generated authentication outcome data, including: granting access to the item when the authentication outcome data indicates that the CBD matches the CBT of the particular entity; and denying access to the item when the authentication outcome data indicates that the CBD fails to match the CBT of the particular entity. Other embodiments of this aspect include corresponding methods, apparatus, and computer programs, configured to perform the actions of the methods, encoded on computer storage devices. These and other embodiments can each optionally include one or more of the following features.

Methods can include determining a geographic region specified in an identification document submitted by the particular entity or based on a GPS location of the particular entity; assigning the determined geographic region as a reference location for the particular entity, wherein storing the CBT with the reference to the particular entity comprises storing the CBT with the reference to the particular entity in a device that is physically located within the reference location.

Methods can include in response receiving the request to access the item: determining the reference location that has been assigned to the particular entity; and transmitting the CBD for one or more physical characteristics of an entity depicted in an image captured by a camera, wherein the circumferential biometric data is transmitted to one or more servers that are located in the reference location independent of a location of the particular entity when the request to access the item is received.

Granting access to the item when the authentication outcome data indicates that the circumferential biometric data matches the CBT of the particular entity can include transmitting, by the one or more servers located in the reference location, access approval data to a particular device securing the item, wherein the access approval data causes the particular device to allow the particular entity to access the item.

Methods can include in response to receiving the request to access the item, accessing a data structure that stores an authority table specifying, for each given entity among a plurality of entities, a reference to the given entity and one or more of a level of access to the item that is assigned to the given entity, time periods during which the given entity is authorized to access the item, or limitations on access to the item, wherein controlling access to the item based on the generated authentication outcome data comprises conditioning access to the item on an entry in the authority table corresponding to the given entity.

Receiving a request to access an item can include receiving a request to access a cryptocurrency wallet. Controlling access to the item based on the generated authentication outcome data can include controlling access to the cryptocurrency wallet based on the generated authentication outcome data.

Obtaining circumferential biometric data for one or more physical characteristics of an entity based on an image captured by a camera can include: receiving data specifying a distance measure between two points of a facial feature of the entity; and determining a circumference measure using the distance measure between two points of the facial feature. Generating authentication outcome data indicating whether circumferential biometric data matches the CBT can include: identifying the facial feature of the entity; comparing the circumference measure to a portion of the CBT that represents the facial feature of the entity; and generating the authentication outcome data based on whether the comparison indicates a match between the circumference measure and the portion of the CBT that represents the facial feature of the entity.

Generating a circumferential biometric template of a particular entity based on one or more images of the particular entity can include: receiving two or more images of the particular entity; for each particular image among the two or more images: identifying multiple different facial features in the particular image; determining a circumference measure for each of the multiple different facial features; and encoding the circumference measures for each of the multiple different facial features to obfuscate the circumference measures; and storing the encoded circumference measures for each of the multiple different facial features together as a particular CBT for the particular entity.

Methods can include generating an additional CBT based on a newly acquired image; and adding the additional CBT to a set of previously stored CBTs, or replacing a previously stored CBT with the additional CBT, based on a level of match between the additional CBT and a given stored CBT exceeding the level of match between the previously stored CBT and the given stored CBT.

Particular embodiments of the subject matter described in this specification can be implemented so as to realize one or more of the following advantages. The authentication techniques discussed in this document provide more accurate identity authentication over conventional techniques. For example, the techniques discussed herein use biometric indicators that are more difficult to fake relative to conventional techniques, making it more difficult for someone to gain unauthorized access to information or physical locations that are secured using the disclosed biometric authentication techniques. The techniques discussed herein are also self-improving, in that the biometric data is not compared to static reference biometric information. Rather, the techniques described herein continually update the reference biometric data, which accounts for normal biometric changes that occur over time (e.g., changes in facial features as people age). The techniques discussed throughout this document also improve the security of stored reference biometric information, for example, by storing this reference biometric information in a server of their home geographic region, such that a person's stored reference biometric information is not being made available in servers across multiple geographic regions beyond their home geographic region. The disclosed authentication techniques can also be performed in various different environments. For example, the authentication techniques can be carried out using a mobile device (e.g., a smartphone), a tablet device, a camera in a storefront, an airport security queue, a bank, a security checkpoint, an entry to a room, or other environments. The authentication techniques can also reduce the amount of data that needs to be stored by a client device, as well as the processing required to be performed by the client device, for example, by performing authentication processes at a server instead of the client device. The Furthermore, security of a person's biometric information can also be improved by performing the biometric authentication at a server of their home geographic region (e.g., in their country of origin, residence, or citizenship), rather than in a server near their current location. The disclosed techniques can provide enhanced security to digital wallets (e.g., a cryptocurrency wallet) or any other desired applications, data, or physical locations.

The authentication techniques can also achieve FIPS 140-2 level 4 security, such that it is difficult to be hacked. For example, the manner in which the circumferential biometric data is determined and encoded makes it very difficult for a third party to gain access to the underlying physical characteristics being represented by the circumferential biometric data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2B shows the depiction of the face captured by the mobile phone and identifies the centers of the left eye, the right eye, and the mouth.

FIG. 2C is an illustration of a representation of facial features using circles.

Like reference numbers and designations in the various drawings indicate like elements.

DETAILED DESCRIPTION

Figure 1:
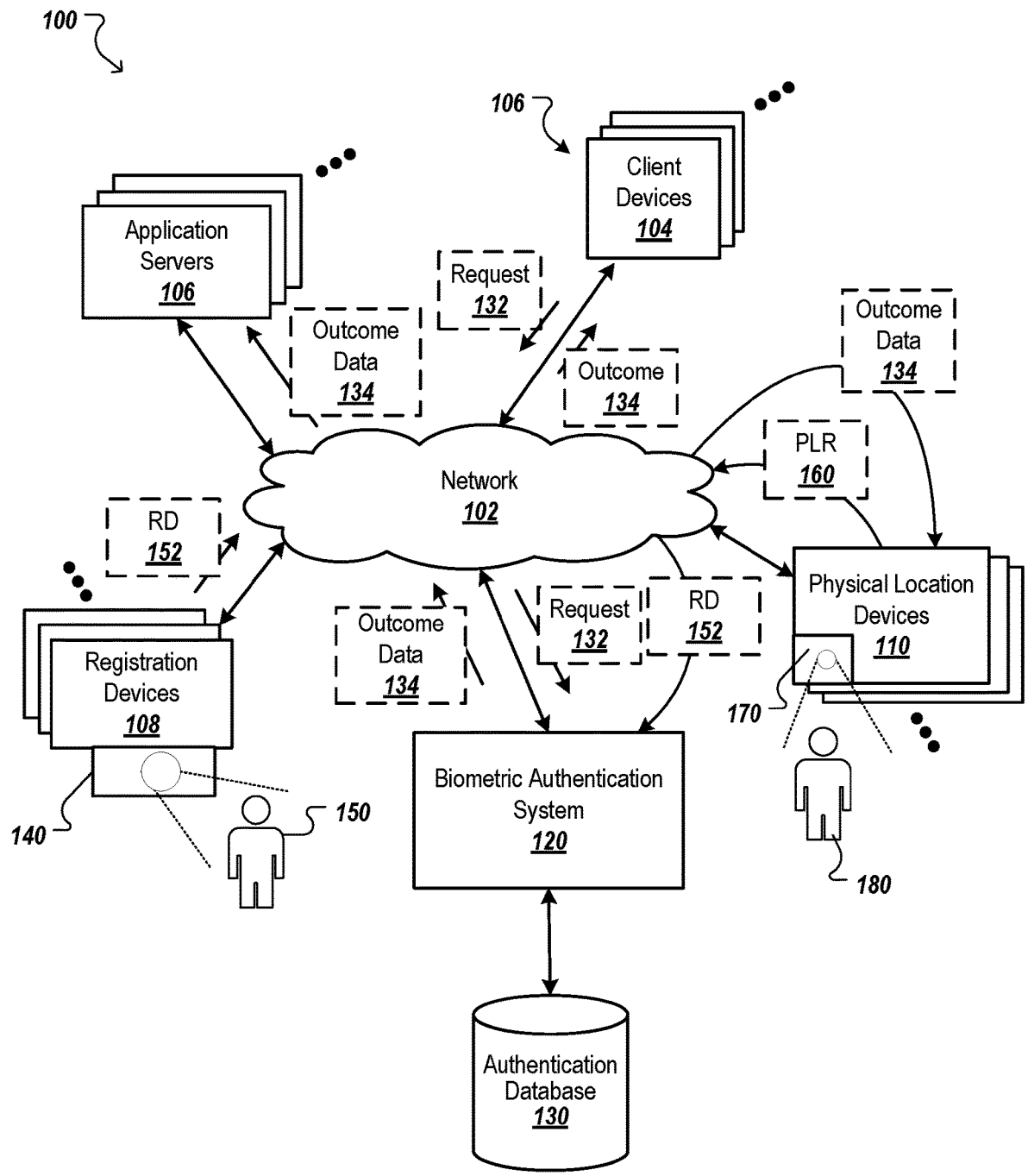
FIG. 1 is a block diagram of an example environment 100 in which biometric authentication can be performed.

This document discloses methods, systems, apparatus, and computer readable media that facilitate enhanced biometric authentication. In some situations, the biometric authentication techniques utilize a circumference generated using distance measures of one or more facial features in order to verify the identity of an entity (e.g., a person). As discussed in more detail throughout this document, the biometric authentication techniques can use other information, such as voice information, personal identification numbers, live entity detection techniques, and/or entity challenges to further secure access to items.

As used throughout this document, the phase "item" refers to anything that can be secured by the authentication techniques discussed herein. In some implementations, an item can be an application (e.g., a native mobile application or web-based application), a physical location (e.g., a room, building, airport, event venue, property, detention center, courthouse, or another physical location), a computing device (e.g., a computer, phone, tablet device, personal digital assistant, a speaker device, or other computing devices), an item in retail location, a vehicle (e.g., a shared ride vehicle, a self-driving vehicle, a personal vehicle, a public transportation vehicle, a watercraft, an airplane, or any other vehicle), an account (e.g., a bank account, an online account, or any other account), or any other item.

As discussed in more detail below, a biometric authentication technique can authenticate the identity of an entity, also referred to as a person for purposes of example, by comparing circumferential biometric data of a person to one or more stored circumferential biometric templates. The circumferential biometric data ("CBD") of a person (or any entity) is a representation of one or more physical attributes of that person. In some implementations, that representation can be generated by obtaining a distance measure of the physical attribute (e.g., facial feature) being represented, determining the circumference measure (e.g., circumference=(pi)d, where d is the obtained distance measure), and using the circumference measure as part of the representation.

The stored circumferential biometric templates ("CBT") for a person (or any entity) is a representation of one or more facial features of a particular entity (e.g., an entity that has already confirmed their identity with the system). As discussed in more detail below, the CBT for a person is used to determine whether an entity requesting access to an item, or otherwise attempting to take a restricted action, is authorized to do so. As discussed in more detail below, the stored CBT can be initially generated for a person when that person registers to use a service implementing the biometric authentication techniques discussed herein. The stored CBT for that person can continue to be updated over time to ensure that the stored CBT is the most accurate representation available for validating the identity of that person.

In practice, when a requesting entity (e.g., an entity requesting access to an item or to otherwise take an action) requests access to an item protected by the biometric authentication techniques discussed herein, the CBD of that requesting entity is compared to the CBT of the person (or people) authorized to access the item. Note that the comparison of the CBD to the CBT includes operations beyond simply performing image matching, and in some situations does not include image matching. When a match exists, access to the item can be granted, but when a match does not exist, access to the item will be denied. As discussed in more detail below, the CBD and/or the CBT can each be encoded (e.g., using cryptography) to provide for additional security when storing and/or transferring CBD or CBT data. Other privacy enhancing features, such as geographic restrictions regarding the storage and transfer of CBD and/or CBT data can also be implemented, as discussed in more detail below.

In some situations, the outcome of the authentication evaluation (e.g., the comparison of the CBD to the CBT) can be visually and/or audibly conveyed to a device that submitted the request to access the item. For example, when the authentication evaluation indicates a match between the CBD and the CBT, an animation and/or 3-dimensional (3D) masking can be applied to a graphic (e.g., an image of the entity requesting access or a stock image) to convey the successful authentication.

The majority of this document describes biometric authentication techniques with reference to physical features of the face, but these techniques are equally applicable to physical features of other body parts, both internal and external. For example, vein scans can be used to determine a distance measurement (e.g., between two defined points such as vein branches), which can be used to determine a circumference measure and/or other CBD from that vein scan. Similarly, bone scans can be used to determine a distance measurement for a bone, which can be used to generate a circumference measurement that characterizes the bone.

FIG. 1 is a block diagram of an example environment 100 in which biometric authentication can be performed. The example environment 100 includes a network 102, such as a local area network (LAN), a wide area network (WAN), the Internet, BLUETOOTH® network, mobile network (e.g., 4G or 5G), or a combination thereof. The network 102 connects client devices 104, application servers 106, registration devices 108, physical location devices 110 and a biometric authentication system 120. The example environment 100 may include many different registration devices 104, user devices 106, application servers 108, and physical location devices 110.

A client device 104 is an electronic device that is capable of requesting and receiving resources over the network 102. Example client devices 104 include personal computers, mobile communication devices, and other devices that can send and receive data over the network 102. A client device 104 typically includes user application, such as a web browser, to facilitate the sending and receiving of data over the network 102, but native applications executed by the client device 104 can also facilitate the sending and receiving of data over the network 102.

An electronic document is data that presents a set of content at a client device 104. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 104 by application servers 106. For example, the application servers 106 can include servers that host publisher websites. In this example, the client device 104 can initiate a request for a given publisher webpage, and the application server 106 that hosts the given publisher webpage can respond to the request by sending machine executable instructions that initiate presentation of the given webpage at the client device 104.

In another example, the application servers 106 can include servers from which client devices 104 can download native applications and/or data used by native applications. In this example, the client device 104 can download files required to install an application at the client device 104, and then execute the downloaded application locally on the client device 104.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 104 to request content from the data source when the given electronic document is processed (e.g., rendered or executed) by a client device 104. The client device 104 integrates the content obtained from the data source into the given electronic document to create a composite electronic document including the content obtained from the data source.

In some situations, the data stored by and/or distributed by the application servers 106 can include sensitive data. For example, an application server 106 that supports a cryptocurrency platform may include information such as, registered user information, account information, transaction information. Additionally, an entity that gains access to this application server 106 may have the ability to initiate fraudulent transactions. For example, if a nefarious entity can gain access to a user's account, that entity can transfer funds, make payments, or otherwise defraud the user without their knowledge. Similar issues can arise with respect to other types of application servers (e.g., healthcare related application servers, government record application servers, retirement account application servers, credit card application servers, or other types of application servers).

To prevent unauthorized access to application servers 106, the application servers can utilize a biometric authentication system 120 to authenticate user identity before granting access to an account and/or before completing transactions. For example, when a client device 104 initiates a request 132 to access account information hosted by a particular application server 106, the request 132 can first be routed to the biometric authentication system 120 to authenticate the identity of the user that is submitting the request before granting access to the account information.

In some implementations, the biometric authentication system 120 performs a biometric authentication technique that outputs authentication outcome data 134, also referred to as outcome data 134 for brevity. As discussed in more detail below, the biometric authentication system 120 utilizes CBD and one or more CBTs in order to determine whether the user submitting the request is a user authorized to access the account (or otherwise access an item). Based on the comparison, the biometric authentication system 120 generates authentication outcome data 134 ("Outcome Data 134"), which indicates whether the user's identity has been verified, and/or whether the user requesting access is authorized to access the account (or other item).

The biometric authentication system 120 can transmit the outcome data 134, or a portion thereof, to one or more of the application server 106 for which the authentication technique was performed (e.g., the application server 106 from which data is being requested by the client device 104), and/or the client device 104 requesting access to the application server 106. As discussed in more detail below, the outcome data 134 can include instructions that trigger the client device 104 to present an animation, 3D mask, and/or another outcome indication (e.g., visual and/or audible) that communicates the result of the biometric authentication technique performed by the biometric authentication system 120.

In some implementations, the outcome data 134 trigger the client device to initiate an animation that fractures a 3D mask, thereby signaling that the user's identity was successfully authenticated. The animation can then depict the fractured mask falling into pieces, revealing the user's image (e.g., a live image of the user being captured by the client device 104).

In operation, a masking algorithm can identify facial features and/or physical landmarks, scale the mask based on the locations of the facial features and/or physical landmarks, and align the presentation of the 3D mask over the image of the user's face being presented on the client device 104 using the locations of the facial features and/or physical landmarks. Various face tracking algorithms can be used to accurately locate the 3D mask over the presented image of the face. This masking can also be performed on any other detectable body part, even internal body parts, such as bones and organs that can be detected and/or imaged.

The outcome data 134 transmitted to the application server 106 can include data confirming the identity of the user and/or any restrictions that may have been placed on the user's access to the application server 106. For example, assume that the application server is a corporate server that hosts data for multiple different groups of the organization (e.g., IT, legal, sales, etc.). In this example, the user's role in the organization can condition the access that the user has to various types of information hosted by the application server (e.g., limiting access to IT resources and/or confidential corporate information). As such, the biometric authentication system 120 can identify the user's role in the organization and generate outcome data 134 that specify the limitations. This outcome data 134 are then transmitted to the application server 106 with instructions that cause the application server 106 to limit access to the user accordingly. Of course, the outcome data 134 transmitted to the application server 106 can differ from the outcome data 134 transmitted to the client device 104, so as to prevent leakage of information to the client device 104. Conditions to access are discussed in more detail later in this document.

As mentioned above, the biometric authentication system 120 compares CBD to one or more CBTs as part of the biometric authentication process. Most examples that follow refer to using a single CBT for brevity, but multiple CBTs can be used as desired.

In some implementations, the CBT used by the biometric authentication system 120 is obtained when a user registers for a service that uses a biometric authentication technique to authenticate user identity. For example, the user can utilize one of many registration devices 108 that facilitate registration with the biometric authentication system 120 and/or the service using the biometric authentication technique. In some situations, the service using the biometric authentication technique is provided by a same entity that operate the biometric authentication system 120, while in other situations, the biometric authentication system 120 performs the biometric authentication technique for a service that is provided by a different entity (e.g., an entity that is separate and distinct from the entity operating the biometric authentication system 120). In either case, the registration devices 108 can be used to facilitate the creation of a CBT for the user.

Registration devices 108 can include, for example, dedicated kiosks, dedicated tablet devices, financial transaction systems (e.g., automated teller machines), or other devices that are configured to facilitate registration with the biometric authentication system 120 by many different people (e.g., located in a public area). Registration devices 108 can also include client devices 104, such as mobile devices, wearables, personal computers, personal digital assistant devices, or tablet devices that are operated by an individual. Irrespective of the specific form of the registration device 108, the registration and creation of the CBT can be similarly performed.

For instance, the registration device 108 can request and collect a variety of information submitted by a user 150 during the registration process, such as the user's name, address, and proof of identity (e.g., driver's license information or passport information). In some situations, the registration device can also capture a voice sample of the user using an audio capture device (e.g., a microphone or audio sensor), as discussed in more detail below.

The registration device 108 can also capture an image of the user during the registration process. The registration device 108 can include an image capture device 140, and the registration device 108 can utilize the image capture device 140 (e.g., a camera, video sensor, or other image capture device) to capture an image of the user 150 being registered. The image can be a still image or a live video image (e.g., including multiple different video frames). In some situations, the captured image can include (or be accompanied by) infrared information. The infrared information can be used to confirm that the captured image depicts a real person, rather than an image of a person or another reproduction of a person. In some situations, the image of the user 150 can be captured using a 3D camera that provides depth of field information, which can help indicate that the image is of a real person rather than another representation (e.g., a previously captured image) of a person.

After the registration device 108 captures the image of the user 150, the registration device 108 can transfer registration data 152 ("RD") to the biometric authentication system 120. The registration data can include, for example, any data submitted by the user 150 to the 108 (e.g., name, etc.) as well as any data generated by the registration device 108 using the captured image of the user 150. In some implementations, the data generated using the captured image of the user 150 can be an image file representing the image of the user. For example, the registration device 108 can simply generate an image file including the image data that is used to generate a visual representation of the user (e.g., still or live motion).

In some implementations, the data generated using the captured image of the user 150 can include data beyond the image file. For example, the registration device 108 can be configured to perform various processes using the image file, such as performing transforms on the image data, performing measurements using the image file, performing object recognition processes on the image file, or otherwise processing the image file to generate additional data.

The processes performed on the image file by the registration device 108 can generate circumferential biometric data ("CBD") for one or more physical characteristics of the user 150. The process of generating the CBD is discussed in more detail below, but the CBD can identify relative locations of various features (e.g., facial features) of the user, and/or generate corresponding circumference measures generated using distance measures of those identified features. For example, using object recognition, the registration device 108 can identify two eyes and a mouth of the user 105 based on image data representing the user's face. The registration device 108 can determine a distance measure (e.g., a length, width, or height) for each of these facial features, a center point of each distance measure, and/or a relative location of each of these facial features (e.g., relative to the other), referred to collectively as feature data. In this example, the registration device 108 can generate the CBD to include this generated feature data, and pass the CBD to the biometric authentication system 120. As discussed further below, the CBD can be encoded (e.g., using cryptography) to enhance the security of the CBD as it is transmitted across the network 102.

In some implementations, the registration device 108 can also can use the distance measures for each feature to generate a corresponding circumference measure for that feature. The circumference measure for each feature can be generated, for example, by computing the circumference of a circle having a diameter matching the distance measure of the feature (e.g., C=(pi)*d), where d is set to the distance measure of the feature). For example, the registration device 108 can use the distance measure of a left eye to generate a circumference measure of a circle having a diameter equal to the distance measure of the left eye, and assign. Similarly, in this example, the registration device 108 can generate circumference measures of circles having diameters matching the distance measures for each of the right eye and the mouth. These circumference measures can each be indexed to, or include a reference to, the feature corresponding to the distance measure used to generate that circumference measure. When the registration device 108 generates the circumference measures, these circumference measures can be included in the CBD, and transmitted to the biometric authentication system 120.

The biometric authentication system 120 receives the CBD from the registration device 108, and stores the CBD in an authentication database 130. The authentication database 130 stores user data required to perform biometric authentication techniques. The user data can include, for example, any of the data received from the registration device 108, user data received from the application servers, and any other data that has been submitted by the user 150. For example, the user 150 may submit additional information directly to the biometric authentication system 120 (or by way of another device), and that additional information can be stored in the biometric authentication system 120.

The data stored in the authentication database 130 can also include authentication data generated by the biometric authentication system 120. In some implementations, the authentication data generated by the biometric authentication system 120 includes one or more CBTs. Each CBT corresponds to a set of CBD obtained for a particular user. For example, the CBD for the user 150 that was received from the registration device 108 can be used to generate a corresponding CBT that is stored in the authentication database 130. The details of generating the CBT are discussed in more detail later in this document, but in operation, the CBTs function as confirmed valid representations of the user 150, and can be compared to subsequently received CBD of an entity requesting access to an item to ensure that the entity requesting access to the item is a person authorized to access the item.

The biometric authentication system 120 can index the CBTs and/or any other information collected about the user 150 to a reference to that user 150. The reference to the user can be an identifier (or other reference) that uniquely identifies the user (e.g., distinguishes the user from other users). For example, the reference to the user 150 can be a random number assigned to the user 150, the result of hashing an account number assigned to the user, or any other reference that can be used to uniquely identify the 150 relative to other users.

Indexing the CBTs and/or any other information collected about users enables the biometric authentication system 120 to search the authentication database 130 for the appropriate CBTs and/or other information (e.g., access information) when a subsequent request 132 for access to an item is received. For example, when the biometric authentication system 120 receives the request 132, the biometric authentication system 120 can identify a reference to a particular entity (e.g., the user 150) in the request 132. In turn, the biometric authentication system 120 can use the reference to the particular entity as a search token to search the authentication database 130.

When the biometric authentication system 120 identifies an entry in the authentication database 130 that matches the reference identified in the 132, the biometric authentication system 120 can use the information from that entry for purposes of performing biometric authentication. For example, as discussed in more detail below, the biometric authentication system 120 can compare CBD included in the request (or obtained responsive to the request) to the CBTs indexed to the matched reference to determine whether the CBD matches the CBTs, and access to the item can be controlled based on the determination (e.g., granting access when match detected or denying access when a match is not detected).

The biometric authentication system 120 can also process requests for access to a physical location. For example, an entity may approach a gated community, a cloud server cage, or any other restricted access physical location (also referred to as a secure physical location), which can trigger submission of a physical location request ("PLR") 160. A physical location request 160 is one type of a request to access an item, which is discussed throughout this document. In the present example, the physical location request 160 is a request to gain entry to a secure physical location, such as a locked building or room.

The submission of the physical location request 160 can be triggered, for example, by a physical location device 110 that detects an entity, referred to as a detected entity 180, in proximity to the secure physical location. The physical location device 110 can include an image capture device 170 that captures an image of the detected entity 180. In some implementations, the submission of the physical location request 160 does not require the detected entity 180 to perform any specific action, such that the detection of the detected entity's presence in the vicinity of the secure physical location (e.g., by the physical location device 110) will cause the physical location device 110 to generate and submit the physical location request 160 to the biometric authentication system 120.

For example, the physical location device 110 can continually (or intermittently) use the image capture device 170 to capture images of an area near a point of access (e.g., a door) of the secure physical location, and monitor for the presence of entities (e.g., people). When the physical location device 110 detects an entity (e.g., detected entity 180) in the field of view of an image capture device 170 (e.g., a camera), the physical location device 110 can capture an image (e.g., still image or video image) of the entity, generate the physical location request 160 to include the captured image, and submit the physical location request 160 to the biometric authentication system 120 for processing. In some implementations, the physical location device 110 can simply include the captured image in the physical location request 160, such that the biometric authentication system 120 can perform further processing on the captured image. In some implementations, the physical location device 110 can encode the image and/or perform operations similar to those discussed with reference to the registration device 108, and submit CBD and/or other information to the biometric authentication system 120. The following discussion assumes that the biometric authentication system 120 performs the processing on the image submitted by way of the physical location request 160.

Upon receipt of the physical location request 160, the biometric authentication system 120 can process the image submitted in the 160 to determine whether the detected entity 180 depicted in the image is authorized to access the physical location secured by the biometric authentication system 120 and/or the physical location device 110. For example, the biometric authentication system 120 can use the image included in the physical location request 160 to generate CBD, and compare that CBD to CBTs of authorized entities to determine whether the CBD of the detected entity 180 matches a CBT of an authorized entity that is authorized to access the physical location.

When the biometric authentication system 120 determines that the CBD of the detected entity 180 does not match any CBTs of authorized entities (e.g., stored in the authentication database 130), the biometric authentication system 120 can respond to the physical location request 160 with outcome data 134 specifying that a match was not identified, and instructions that prevent the physical location device 110 from granting access to the secure physical location.

When the biometric authentication system 120 determines that a match exists between the CBD of the detected entity 180 and a CBT of an authorized entity, the biometric authentication system 120 can respond to the physical location request with outcome data specifying that a match was identified and that the detected entity 180 has been verified as an authorized entity. In some implementations, the outcome data 134 specifying that the match was identified can include instructions that cause the physical location device 110 to grant access to the secure physical location. For example, the instructions can cause the physical location device 110 to unlock a door, activate a motor that physically opens a gate or door, or otherwise provides the detected entity 180 access to the secure physical location, e.g., unlocking a turnstile at an airport or event venue.

In some situations, the determination that the detected entity 180 (or any entity that submits a request 132) is an authorized entity can be based on additional biometric checks in addition to the comparison of the CBD of the detected entity 180 to CBTs of authorized entities. For example, assuming that the biometric authentication system 120 identifies a match between the CBD for the detected entity and an authorized entity, the biometric authentication system 120 can require confirmation that the entity passes another biometric check before granting access to the secure physical location (or access to an item). In some implementations, the biometric authentication system 120 can require a voice verification of the detected entity before confirming the entity as an authorized entity, and granting access to the secure physical location (or granting access to an item in response to a request 132). For example, the voice verification can always be required, or only required when matching of the CBD to the CBT is below a specified level of match (e.g., less than a specified level of similarity between the CBD and any CBT for the entity or less than a threshold level of confidence of the match existing).

The voice verification can be performed, for example, by comparing a submitted voice sample of the detected entity to a stored voice reference of an authorized entity (e.g., an entity that is authorized to access the secure physical location), and determining whether a match exists. In some implementations, the voice sample and the stored voice reference can be audio files that are compared to determine whether the data in the audio files matches. In some implementations, the voice sample and the stored voice reference can be audio fingerprints generated from audio files of the captured entity's voice and the authorized entity's voice, respectively.

An audio fingerprint is a condensed digital representation of an audio signal. Audio fingerprints can be used to identify an audio sample or quickly locate similar items in an audio database. For example, an audio sample (e.g., a sample of an entity's voice) can be translated into a spectrogram, which provides a graph of the plots frequency vs. amplitude vs. time, and significant points (e.g., locations of amplitude peaks in the graph) can be selected and/or encoded (e.g., using hashing) to create a fingerprint that uniquely identifies the entity's voice. That fingerprint can then be used as a stored voice reference, and compared to additional fingerprints of newly acquired voice samples to determine whether there is a fingerprint match. When a fingerprint match exists, the newly acquired voice samples (e.g., of the captured entity).

A match between fingerprints can be considered to exist when there is an exact match between two fingerprints, or when there is more than a specified level of match between two fingerprints. For example, a match can be considered to exist when there is at least a 90% match between fingerprints (or some other specified level of match). The specific level of match can be selected based on various factors and modified, as desired.

Other biometric checks can also be used in combination with the evaluation of CBD to CBTs to confirm the identity of entities requesting access to an item. For example, fingerprint analysis of scanned fingers, retinal scans, or challenges can be used to confirm the identity of an entity. Challenges can take the form of requesting answers to questions previously submitted by an authorized entity. For example, an entity can be requested to submit an answer to the question "what type of car did you own first," or to answer other similar questions that the authorized entity previously submitted to the biometric authentication system 120 (e.g., during the registration process).

The physical location device 110 can take many different forms. For example, the physical location device 110 can simply be a security camera that provides video data to a server or a data storage location (e.g., cloud computing platform). Other examples of physical location devices can include automation solutions that include one or more data processing apparatus that are capable of performing various operations discussed throughout this document. The physical location device 110 could also include cameras in a retail setting or public transportation setting, and validate the identity of people to perform various actions (e.g., automated checkout, entry to a plane or train, etc.).

Figure 2A:
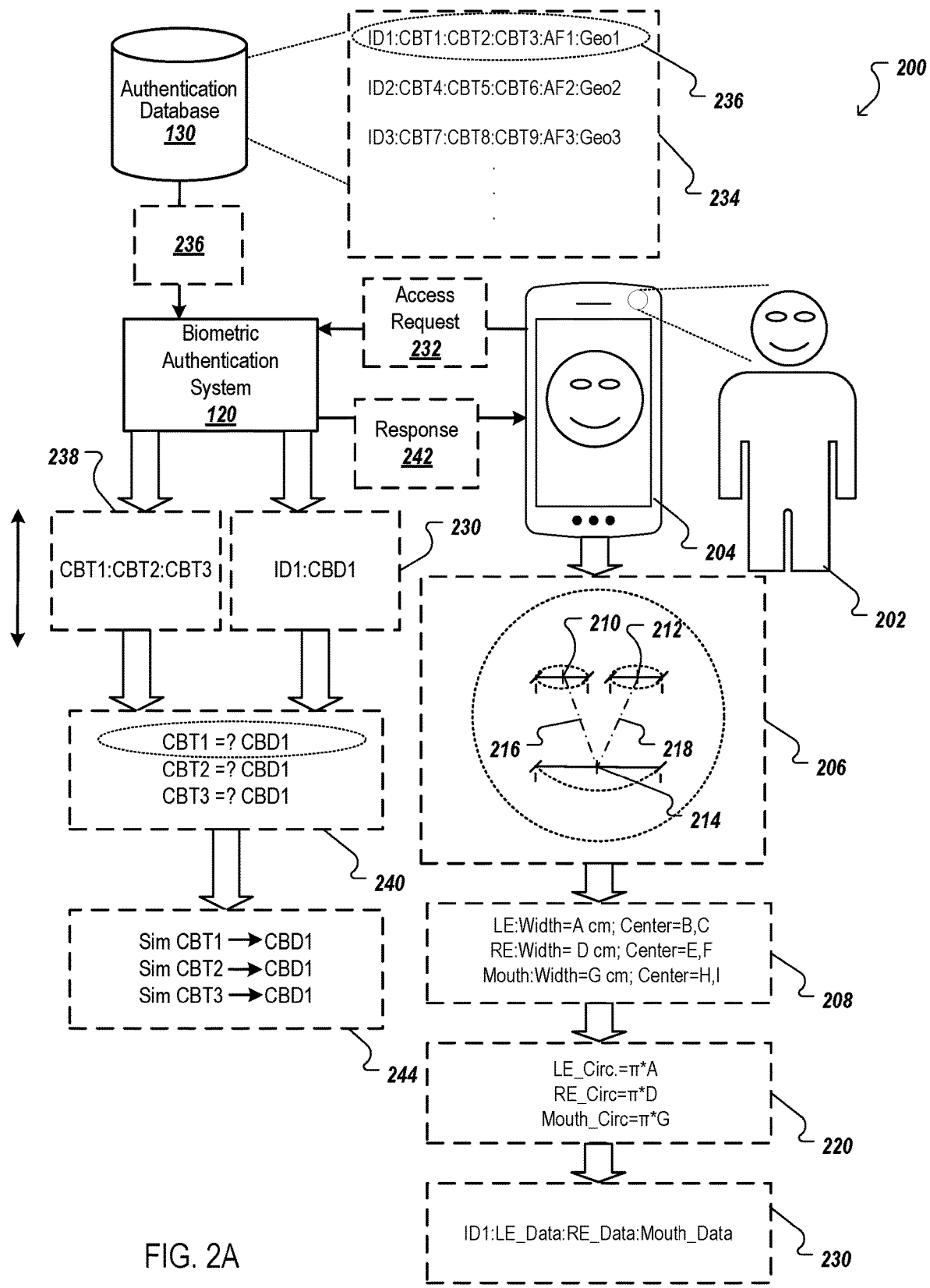
FIG. 2A is an illustration depicting an example biometric authentication process.

FIG. 2A is an illustration 200 depicting an example biometric authentication process, which is also referred to as an "authentication process" for brevity. The authentication process depicted by FIG. 2 is described in the context of a user 202 using a mobile phone 204. However, the authentication process can be performed using a variety of devices. For example, the authentication process can be performed using a tablet device, a desktop computer, a laptop computer, and/or any other device that can capture an image of an entity (e.g., security cameras). Additionally, with reference to FIG. 2, various operations are discussed as being performed by either the mobile phone 204 or the biometric authentication system 120. However, it is contemplated that operations described as being performed by the mobile phone 204 could be performed by the biometric authentication system 120, and that at least some of the operations described as being performed by the biometric authentication system 120 could be performed by the mobile phone 204, or another device.

The authentication process can begin with the mobile phone 204 capturing an image of the user 202. For example, the user 202 can use a self-facing camera on the mobile phone 204 to capture a "selfie" of their face. The selfie can be either a still image or a video clip that captures motion, for example, over multiple video frames. The description that follows discusses processing the captured image generally, such that the operations discussed below can be performed using a single still image or a video clip that includes multiple frames.

The mobile phone 204 can process the captured image to identify various features of the face depicted in the image. For example, the mobile phone 204 can use object recognition techniques to identify eyes, a nose, a mouth, ears, and/or other features of a face or head (e.g., location of hairline). Once the mobile phone 204 has identified facial features depicted in the image, the mobile phone can determine a distance measure for these facial features. In some implementations, the distance measure for the facial features is a width of the facial features (e.g., a horizontal measure between two endpoints of the facial feature). For example, as shown in the box 206 of FIG. 2, the mobile phone 204 can measure a horizontal width of each eye, and the mouth depicted by the image captured by the mobile phone 204. As depicted in FIG. 2, the horizontal width can be taken along an axis that is substantially 0 degrees, but it is contemplated that the distance measure can be taken along an axis of any angle.

The mobile phone 204 can use the distance measures of the facial features to generate a set of facial parameters 208. The set of facial parameters represent various characteristics of the face depicted in the captured image. For example, as shown in FIG. 2, the set of facial parameters 208 can specify characteristics of a left eye ("LE") a right eye ("RE"), and a mouth. For each of these facial features, the set of facial parameters 208 can specify a width, or another distance measure, and a center location ("Center") of the facial feature.

Continuing with the example above, the set of facial parameters 208 can indicate that the left eye has a width of A centimeters, and is located at coordinates B,C (210) in a two dimensional coordinate system. The set of facial parameters 208 also indicates that the right eye has a width of D cm and a center located at coordinates E, F (212), and that the mouth has a width of G cm and a center at coordinates H, I (214). Of course, a 3-dimensional coordinate system can also be used to identify the locations of facial features, and other units of distance measure can be used to represent the length of the facial features. Furthermore, the width could also be measured along a linear or non-linear curve between any two points of a facial feature. In some implementations, the center of a facial feature is identified as being at a midpoint of a line that extends between two reference points of the facial feature that are used to determine the distance measure.

The mobile phone 204 can use the set of facial parameters 208 to determine additional characteristics, and/or or create additional representations, of the face depicted by the captured image. For example, the center coordinates of the facial features can be used to determine relative locations (e.g., distances and angles between) the facial features. For example, the mobile phone 204 can determine the distance and angle between the center of the mouth 214 and the center of each eye 210 and 212, as depicted by the dashed lines 216 and 218.

The mobile phone 204 can use the set of facial parameters 208 to generate a set of circumference measures 220 for the facial features. The circumference measure for each facial feature can be determined by determining the circumference of a circle having a diameter that matches the distance measure (e.g., the width) of the facial feature. For example, the mobile phone 204 can determine that the circumference measure for the left eye ("LE_Circ.") is equal to pi*A, that the circumference measure for the right eye ("RE_Circ.") is equal to pi*D, that the circumference measure for the mouth ("Mouth_Circ.") is equal to pi*G. The transition between the face depicted in the box 206 to a representation of the face using the circumference measures is illustrated in FIG. 2B.

FIG. 2B shows the depiction of the face captured by the mobile phone 204, and identifies the centers 210, 212, and 214 of the left eye, the right eye, and the mouth, respectively. The box 222 is a depiction of the left eye, right eye, and mouth using circles having the circumference measures determined above. For example, the left eye is depicted by the circle 224 having the circumference equal to pi*A, the right eye is depicted by the circle 226 having the circumference equal to pi*D, and the mouth is depicted by the circle 228 having the circumference equal to pi*G.

The mobile phone 204 can generate additional data representing facial features. For example, the mobile phone 204 can determine additional characteristics of the face beyond those discussed above. In some implementations, the mobile phone can measure a distance from the chin to the bottom of the nose, a width of the nose, a distance between the eyes (or between the centers of the eyes determined above), a distance from the top of the mouth to the nose, a width of the face, and/or a distance from the bottom of the chin to the hairline (or eyebrows). These distances and/or ratios of these distances (and/or any other facial feature representations discussed above) can all be used to generate a representation of the face. Similarly, each of these distances can be used to generate a circumference measure in a manner similar to that discussed above.

Furthermore, the relative locations and/or overlapping portions of circles having the determined circumference measures can be generated and/or used as an additional characteristic of the face. FIG. 2C is an illustration 270 of a representation of facial features using circles 272, 274, 276, and 278. As discussed above with reference to FIG. 2B, in this illustration 270, the circle 272 can represent the left eye, the circle 274 can represent the right eye, the circle 276 can represent the mouth. In this illustration 270, the circle 278 can represent the nose of the face, and have a circumference that is determined as pi*nose_width. As shown, the circles in this example overlap in the portions 280*a*, 280*b*, and 280*c*. The locations of these overlaps, and/or the amount of overlap can be used as further indications of the uniqueness of this face. As such, the mobile device 204 can determine the amount of overlap, intersection points of the circles, ratios of specified circle areas or circumferences, and/or other interrelated characteristics of these circles, and use these as characteristics of the face.

Referring back to FIG. 2A, the mobile phone 204 can continue the authentication process by generating a set of CBD 230 for the face depicted in the captured image. In some implementations, the mobile phone can generate the set of CBD 230 to be a representation of the set of facial features 208. For example, the mobile phone 204 can include any, or all, of the set of facial parameters 208, the set of circumference measures 220, and/or any other data generated using the characteristics of the facial features in the set of CBD 230. Continuing with the example above, the CBD generated for the facial features are referred to in aggregate as left ear data ("LE_Data"), right ear data ("RE Data"), and mouth data ("mouth data") in the set of CBD 230.

In some implementations, each facial feature represented by the set of CBD 230 can be considered a node, and the data representing that node (e.g., location, circumference measure, and/or other data such as relative locations to other nodes) can be encoded as part of the process of generating the CBD 230. For example, assume that the characteristics of the left ear include an absolute location (e.g., 2-dimensional coordinates) of the left ear in the captured image, a relative location to each of the right eye and the mouth, and the circumference measure for the left ear. In this example, each of these characteristics can be encoded and then aggregated or aggregated and then encoded to create the representation of the left ear (e.g., the LE_Data) that is included in the set of CBD 230. The data representing the left ear node can be encoded, for example, using one or more appropriate cryptography techniques (e.g., secret key cryptography).

Various data masking techniques can also be used to further protect the underlying CBD data. For example, the CBD can be masked using one or more of a secure lookup algorithm, segmented mapping, a mapping algorithm, a binary lookup algorithm, or a tokenization algorithm. These masking techniques prevent the real underlying data from being transmitted, while still enabling the recovery of the underlying data by a receiving device that is configured to use these masking techniques.

As shown in FIG. 2A, the set of CBD 230 can be generated to include an identifier ("ID1") that corresponds to, and uniquely identifies, a particular entity. For example, the identifier can be a random number that was assigned to the user 202 when the user 202 registered for a service that utilizes the authentication process. Other identifiers can be used as appropriate, as discussed above. In some implementations, the identifier may not be a part of the initially created set of CBD 230, but can be added to or appended to the set of CBD 230, as desired. For example, after creating a given set of CBD that doesn't include an identifier, the mobile phone 204 can append the identifier (e.g., ID1) to the given set CBD, or include the identifier in a data packet that is transmitted to the biometric authentication system 120 with the given set of CBD.

The mobile phone 204 can continue the authentication process by transmitting an access request 232 that includes the set of CBD 230 to the biometric authentication system 120. The access request 232 can be a request to access a particular item. For example, the access request can be a request to access a particular application that is installed on the mobile phone 204, a request to access a physical location (e.g., a secure location), a request to access a locked computer, a request to unlock the mobile phone 204, or a request to conduct a transaction (e.g., a monetary withdrawal, transfer, or deposit). In a specific example, the access request can be a request to access or conduct a transaction using a cryptocurrency wallet that is installed on the mobile device 204.

The biometric authentication system 120 receives the access request 232 from the mobile phone 204, and inspects the contents of the access request 232. In some implementations, the biometric authentication system 120 identifies, within the access request 232, the identifier of the user 202. Using this identifier, the biometric authentication system 120 can search the authentication database 130 to determine whether there is an entry indexed to the identifier. Continuing with the example above, the biometric authentication system 120 can identify the identifier ID in the access request 232, extract that identifier ID1, and use it as a search token to search the authentication database 130. For example, the biometric authentication system 120 can use the identifier ID1 to identify, within authentication data 234, the entry 236 that is indexed to the identifier ID1. The biometric authentication system 120 can then use the identified entry 236 to continue the authentication process.

The authentication database 130 stores a data structure that includes a variety of data. In some implementations, the data stored in the authentication database 130 is authentication data 234 required to authenticate the identity of users according to the biometric authentication process. The authentication data 234 can be indexed in one or more different ways to facilitate identification of a portion of the authentication data 234 that will be used to authenticate an entity's identity when an access request 232 is received. For example, the authentication can be indexed according to identifiers of entities for whom data is stored, such that a user identifier (e.g., ID1) included in the access request 232 can be used to locate the appropriate entry in the authentication data 234 (e.g., the entry storing information for the user represented by the user identifier).

The authentication data 234 can also be indexed according to one or more dimensions, such as authorized user lists, geographic location, access level, or other dimensions. Indexing the authentication data 234 according to other dimensions allows for the identification of the appropriate entries in the authentication data 234, for example, when the access request 232 does not include a user identifier (e.g., when an entity is detected by a security system camera, an in-store camera, a video sensor, or another image capture device).

To illustrate, assume that an entity is detected by a camera at a particular building. In this example, the access request may be generated simply by the entity approaching a door (e.g., without the entity taking any affirmative action to initiate the submission of the access request), and the identifier of the entity may not be known. To facilitate the determination of whether the entity is authorized to access the particular building without having the identifier for the entity, the biometric authentication system 120 can use an identifier for the building to search the authentication database for authentication data 234 of users that are authorized to access the particular building. For example, the authentication data 234 for users that are authorized to access the building may be indexed to a building identifier corresponding to the building, and indicating authorization to enter the particular building. In this example, the biometric authentication system 120 can then compare the CBD in the access request to the CBTs of the entities indexed to the building identifier, and control access to the building based on whether the CBD for the detected entity matches one of the identified CBTs corresponding to users authorized to access the particular building.

The authentication data 234 stored in the authentication database 130 can include CBTs for various entities (e.g., CBT1-CBT9), audio fingerprints for the various entities (e.g., AF1, AF2, AF3), geographic information for the various entities (e.g., Geo1, Geo2, Geo3), as well as other information.

The CBTs for each entity are representations of the entity's facial features. As discussed in more detail below, the CBTs for a particular entity can be used to validate that particular entity's identity when the particular entity requests access to an item. Continuing with the example above, CBT1, CBT2, and CBT3 can be used to validate (or authenticate) the identity of the entity that is identified using ID1, CBT4, CBT5, and CBT6 can be used to validate (or authenticate) the identity of the entity that is identified using ID2, and CBT7, CBT8, and CBT9 can be used to validate (or authenticate) the identity of the entity that is identified using ID3.

The audio fingerprints for each particular entity are digital representations of that particular entity's voice. For example, as discussed above, the audio fingerprints can be mappings of peaks in a spectrogram created using the particular entity's voice. The audio fingerprints can be used in combination with, or by themselves as appropriate, to authenticate the identity of an entity requesting access to an item. In some situations, the authentication of an entity requires a match between the CBD received in an access request and/or a voice sample (or audio fingerprint thereof) submitted by the user. Continuing with the example above, the audio fingerprint AF1 can be used to validate (or authenticate) the identity of the entity that is identified using ID1, the audio fingerprint AF2 can be used to validate (or authenticate) the identity of the entity that is identified using ID2, the audio fingerprint AF3 can be used to validate (or authenticate) the identity of the entity that is identified using ID3.

The geographic information for each entity specifies one or more geographic characteristics of the entity. In some implementations, the geographic characteristics of an entity can include one or more of a home geographic location, previously visited geographic locations, a last detected geographic location, and/or registered geographic locations for the entity (e.g., geographic locations submitted to the biometric authentication system 120 by the entity).

The home geographic location for each particular entity can be a reference location for that particular entity. For example, the home geographic location for a particular entity can specify a geographic region in which that particular entity resides, a geographic region in which that particular entity has citizenship, a geographic region in which that particular entity registered with the biometric authentication system 120, or another reference geographic region.

Previously visited geographic locations for each particular entity are geographic locations that have been visited by that particular entity. For example, assume that an entity has traveled to the United States, Great Britain, Canada, and Australia. In this example, each of these countries can be identified as previously visited geographic locations for this particular entity. The previously visited geographic locations for each particular entity can be detected (and/or collected) in various ways. For example, each access request 232 can include GPS or other location data (e.g., IP address information, time zone information, etc.), and this location data can be stored when the entity's identity is authorized using the information in the access request 232. In another example, the entity can enable location services for an application that utilizes the biometric authentication system 120, and permit the application to utilize the entity's location data.

The last detected geographic location for each particular entity can be a geographic location at which that particular entity was last detected. The last detected geographic location can be determined, or identified, for example, based on timestamps that are stored with the geographic locations that are stored for the particular entity. In another example, each stored location can be assigned a next unused number when it is stored, such that the geographic location having the highest assigned number can be considered the last detected geographic location for the particular entity.

The geographic characteristics of each particular entity can be used in various ways during the authentication process. For example, the home location of an entity requesting access to an item can be used to determine where the entity's identity should be validated or authenticated. In some implementations, the biometric authentication system 120 can require that an entity's CBT and/or other data stored in the authentication database 130 be stored by a database that is physically located in the home location (e.g., country of citizenship or residence) for the entity. For example, if the user 202 is a citizen and resident of the United States, the biometric authentication system 120 can require that the authentication data 234 for this entity be stored in a database that is physically located in the United States. This can provide additional privacy protections over that provided by other privacy protections, such as data encryption, for example, by ensuring that the user's data is maintained in their home geographic region, thereby making it less accessible to people located in another geographic region.

Similarly, the biometric authentication system 120 can require that the access request 232 be routed to, and processed by, a server of the biometric authentication system 120 that is physically located in the user's home geographic region, such that the user's sensitive data is only decrypted, and/or processed within the user's home geographic region. Continuing with the example above, if the user 202 is located in France when they initiate the access request 232, the biometric authentication system 120 can determine the home location for the user 202, and route that access request 232 to a server of the biometric authentication system 120 that is located in the United States, i.e., the home geographic region of the user 202, for processing. Again, this can reduce the opportunity for entities in a different geographic region to gain access to the user's sensitive data.

The geographic information can also be used to enhance security of transactions and/or determine whether access requests are valid. For example, assume that the access request 232 is requesting access to a building located in Washington State, while the last detected location of the user 202 was in Georgia five minutes prior to the biometric authentication system 120 receiving the access request 232. In this example, the biometric authentication system 120 can classify the access request as invalid (or fraudulent) based on the fact that the user 202 cannot be in Washington State five minutes after having been detected in Georgia. In this situation, the biometric authentication system 120 can deny access based on this determination/classification of the access request 232, thereby preventing fraudulent activity by using the geographic information.

Once the biometric authentication system 120 has obtained the authentication data included in the entry 236 identified using the information in the access request 232, the biometric authentication system 120 can compare the set of CBD 230 included in the access request 232 to the CBTs from the entry 236. For example, the biometric authentication system 120 can compare the set of CBD 230 for the user 202 (e.g., CBD1) to the set of CBTs 238 that were included in the entry 236. For example, a set of comparison operations 240 can be carried out by the biometric authentication system 120 to determine a level of similarity between CBD1 and each of the CBTs from the entry 236 (e.g., CBT1, CBT2, and CBT3). The comparisons can determine whether a match exists between CBD1 and any of CBT1, CBT2, or CBT3. A match can be considered to exist when CBD is exactly the same as the CBT to which it is being compared. In some situations, a match can also be considered to exist when there is at least a specified level of similarity between the CBD and the CBT to which it is being compared, as discussed above.

In some situations, the biometric authentication system 120 can authenticate the user's identity as soon as a match is determined to exist between CBD1 and at least one of the CBTs. For example, assume that the first comparison performed by the biometric authentication system 120 is between CBT1 and CBD1. In this situation, the biometric authentication system 120 can identify the user 202 as the entity identified by ID1 based on that single match, and halt any further comparisons of CBD1 to other CBTs.

In some situations, the biometric authentication system 120 can authenticate the user's identity only after two or more of the CBTs from the entry 236 are determined to be matched by CBD1 from the set of CBD 230. For example, after determining that CBD1 matches CBT1, as discussed above, the biometric authentication system 120 can refrain from authenticating the user's identity until the biometric authentication system 120 further determines that CBD1 also matches at least one of CBT2 or CBT3, or both.

In some situations, the biometric authentication system 120 continues evaluating the user's identity until at least a specified level of confidence is reached. For example, the biometric authentication system 120 can continue comparing CBD1 to additional CBTs until the biometric authentication system 120 reaches a 95% level (or any other appropriate level) of confidence that the user's identity is confirmed. In some situations, the biometric authentication system 120 can combine the results of the comparison between CBD1 and CBTs with other authentication techniques in an effort to reach the specified level of confidence in the user's identity. For example, the biometric authentication system 120 can combine the outcome of the CBD1/CBT comparisons with the outcome of a comparison between an acquired voice sample of the user with a stored audio fingerprint (e.g., AF1) for the user. The level of match between the voice sample of the user with a stored audio fingerprint can either increase the overall confidence (e.g., when there is a high level of match between the voice sample of the user with the stored audio fingerprint) or lower the overall level of match (e.g., when there is a low level of match between the voice sample of the user with the stored audio fingerprint).

When the biometric authentication system 120 has authenticated the user's identity as that of the entity identified by ID1, the biometric authentication system 120 can generate a response 242 to the access request 232. The response 242 can include instructions that grant the user 202 access to the item. For example, the response 242 can include instructions that trigger actions or operations similar to those discussed above with reference to the outcome data 134 of FIG. 1. In some implementations, the response 242 can be considered a form of the outcome data 134.

In some implementations, the biometric authentication system 120 can evaluate a set of similarity measures 244 that were generated during the comparison operations 240, or generated independent of the comparison operations 240. The set of similarity measures 240 can include a measure of similarity (e.g., a level of match) between CBD1 and each of the CBTs from the entry 236, as well as levels of similarity between each of the CBTs.

Evaluation of the set of similarity measures 240 can reveal the representations of the user's facial features that are best to use for purposes of authenticating the user's identity moving forward, e.g., through the authentication process described above. For example, assume that CBD1 has a higher level of similarity to CBT1 and CBT2 than the levels of similarity between CBT3 and each of CBT1 and CBT2. In this example, the newly acquired CBD1 can be considered to be a better candidate than CBT3 for authenticating the user's identity for future access requests based on CBD1 having the higher level of similarity to CBT1 and CBT2. As such, the biometric authentication system 120 can store CBD1 as a new CBT for use in subsequent iterations of the authentication process. In some situations, the biometric authentication system 120 can replace CBT3 with CBD1 in the set of CBTs stored in the entry 236. In some situations, the biometric authentication system 120 can simply add CBD1 as a new CBT for use along with the CBTs that were already included in the entry 236. Similar techniques, e.g., storing the best matching templates, can be used to update the audio fingerprints that are used for identify authentication, iris scans used for identity authentication, body vein scans, or any other physical identifiers.

Figure 3:
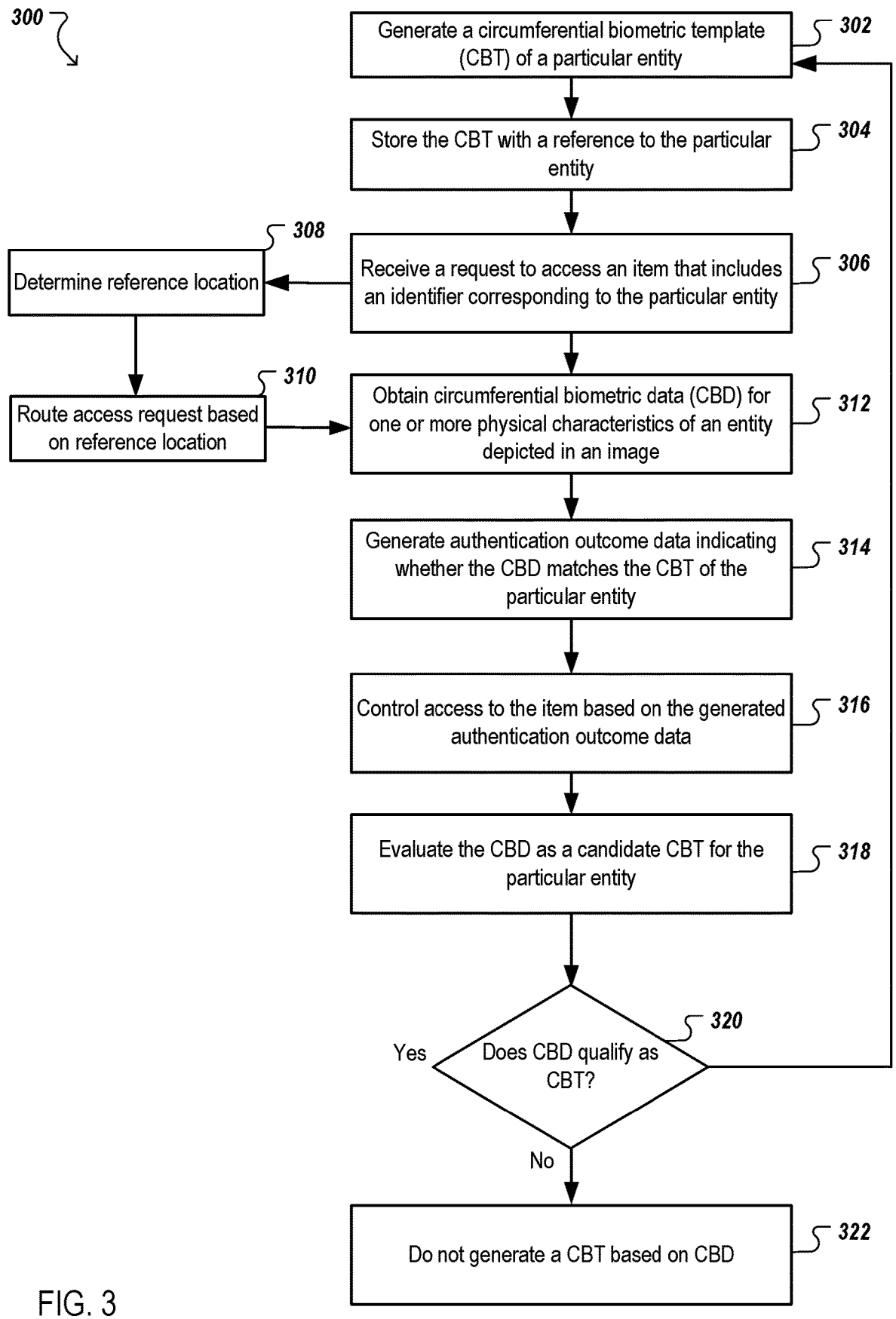
FIG. 3 is a flow chart of an example biometric authentication process.

FIG. 3 is a flow chart of an example process 300 for performing a biometric authentication process. In some implementations, operations of the process 300 can be performed, for example, by the biometric authentication system 120, client devices 104, and/or one or more other data processing apparatus. In some implementations, operations of the process 300 can be implemented as instructions stored on one or more non-transitory computer readable medium. Execution of the instruction can cause one or more data processing apparatus to perform operations of the process 300.

A circumferential biometric template (CBT) of a particular entity is generated (302). In some implementations, the CBT is generated based on one or more images of the particular entity. The CBT is a representation of one or more facial features of the particular entity. In some implementations, one or more CBTs are generated for an entity (e.g., a person) when that person registers for a service that utilizes biometric identity authentication. For example, and as discussed above, the CBT for a person can be generated when a person registers to use a cryptocurrency wallet, registers to obtain access to a building or another restricted access physical location, registers for access to a secure online resource, registers to access a restricted access computing system, or registers to access another restricted access item.

The registration process, which includes the generation of the CBT, can include the user providing identity verification information. In some implementations, the identity verification information is information that demonstrates the user's actual identity. Identity verification information can be obtained, for example, from one or more identity documents. Examples of identity documents include a driver's license that lists the person's name and home address, a passport, or another government issued (or otherwise verifiable) identity document that can be used to confirm that the person registering for the service is who they claim to be.

The identity verification information can combined with other information to create a verified profile of the person registering for the service. For example, other information that can be included in the verified profile can include a home geographic region for the person. In this example, the home geographic region can be a country and/or state of residence and/or citizenship. The home geographic region can be determined, for example, based on one or more of the person's location at the time they are registering (e.g., as determined using GPS, IP address information, device language settings, or other indications of a person's geographic location), geographic information input by the user, and/or determined based on a geographic region specified in an identity document submitted by the particular entity (e.g., scanned or photographed during the registration process). The geographic region that is identified (or otherwise determined) for the person registering can be assigned as that person's reference geographic region, which can be subsequently used for a variety of operations (e.g., routing and/r processing access requests), as discussed throughout this document.

The registration process can also include the acquisition of one or more images of the person registering. The images can be obtained, for example using a mobile phone of the user or another image capture and/or video processing device (e.g., a video sensor). The image capture device can be part of a registration kiosk, an automated teller machine, a desktop computer, a laptop computer, a tablet device, or a digital assistant device. In some situations, multiple different images (e.g., two or more) of the person are used to generate multiple different CBTs of the person during the registration process. As noted above, the images can be still images or videos (e.g., live action captures over time).

Multiple different facial features are identified (or otherwise detected) in each of the images obtained during the registration process. For example, a nose, eyes, bottom of chin, ears, location of hairline, and/or other facial features can be determined using object identification techniques on the images.

Once the multiple different facial features are identified in a particular image, those facial features can be considered nodes, and the characteristics of those nodes can be determined as part of the CBT creation process. For example, each node (i.e., facial feature) can be characterized by a distance measure between two reference points of the facial feature represented by that node. In a particular example, assume that the two reference points for the left eye are located at each side of the eye opening. In this example, the distance measure for the left eye can be a distance between these two reference points, which can be assigned as one of the characteristics of the node that represents the left eye. Distance measure can similarly be determined for the other identified facial features and assigned to the nodes representing those facial features. Furthermore, the distance measures can be determined for each of the images obtained.

Once the distance measure for a particular facial feature has been determined, a location of the facial feature in the image can be determined. In some implementations, the location of the facial feature in the image can be determined to be at a midpoint (e.g., a center) of the determined distance measure. This midpoint can be considered the absolute location of the node within the image, and used, for example, for purposes of determining relative locations of various facial features, as discussed above with reference to FIGS. 2A-2C.

The distance measure for the particular facial feature can also be used to generate a circumference measure for the node representing the facial feature. For example, as discussed above with reference to FIGS. 2A-2C, the circumference measure can be computed as a product of $\pi *d$ (e.g., $C_{fx}=\pi *d_{fx}$, where $C_{fx}$ is the circumference measure for facial feature x, and $d_{fx}$ is the distance measure for the facial feature x). The circumference measure can be computed using the distance measure for each facial feature, and those circumference measures can be used as characteristics of the nodes representing the corresponding facial features.

The characteristics of the nodes representing the facial features can be encoded (e.g., using cryptography) to prevent unauthorized access to the person's facial features. For example, secret key cryptography can be used to encode the characteristics for each node, such that the characteristics will only be accessible by devices having the secret key. This encoding obfuscates the characteristics, thereby preventing unauthorized access to these characteristics. Additional techniques can be used, as appropriate, to further limit access to the characteristics (e.g., hashing).

In some implementations, the CBT for a particular depiction of a face (e.g., for a particular image of the face, can be created by combining the characteristics of each node representing the facial features of the face, and storing them together as a particular CBT for the particular entity. For example, the CBT can be a combination of the absolute locations of the nodes representing the facial features, circumference measures determined for the facial features, relative locations of each of the nodes relative to each other (e.g., relative locations between two or more of eyes, nose, mouth, temple, chin, eye brows), and/or head circumference. These combinations of features can be represented in a multidimensional vector, where each term of the vector corresponds to a particular characteristic of a node representing a facial feature. The CBT can be specified using other formats, as appropriate.

The CBT is stored with a reference to the particular entity (304). In some implementations, the reference to the particular entity is a randomly generated user identifier, or another identifier that uniquely distinguishes the particular entity from other entities. For example, the reference to a particular person could be a username, a number, a hash of information corresponding to that particular person, or some other reference to that particular person.

As discussed above, the CBT can be stored in a data structure. The data structure can index the CBT and/or other information about the specific entity to one or more index keys to facilitate the identification of the appropriate entry in the data structure using one of several different searches. In some implementations, the CBT for a particular entity is stored in a device that is physically located in the reference location for that particular user. For example, if the reference location (e.g., home location) for a particular person is in the United States, then the CBT for that particular person can be stored in a device that is physically located in the United States. This helps ensure that biometric information is stored in compliance with the requirements of a person's home country.

In some implementations, the CBT of the particular entity is stored in the data structure with an authority table or a reference (e.g., pointer) to the authority table. In some implementations, the authority table specifies, for each given entity among multiple different entities, a reference to the given entity and one or more of a level of access to a particular item that is assigned to the given entity, time periods during which the given entity is authorized to access the particular item, or limitations on access to the particular item.

For example, assume that a particular person is allowed to access a particular secure location (e.g., physical or network locations) from 8 am-5 pm on Monday-Friday. In this example, the authority table can include an entry that limits this particular person's access to the particular secure location to the times that this person is allowed to access the particular secure location. In this way, the particular person's access can be limited when an access request is determined to be from this particular person, but the time of the access request is outside of the times they are authorized to access the particular secure location.

After storing the CBT with the reference to the particular entity, a request to access an item ("access request") is received (306). In some implementations, the access request includes an identifier corresponding to the particular entity that submitted the access request. For example, the access request can include a user name corresponding to the particular entity, a device identifier, a hash of a combination of the user name and device identifier, or some other data representing the particular entity. As discussed throughout this document, the access request can be a request to access a variety of items. In a particular implementation, the access request can be a request to access a cryptocurrency wallet, or complete a transaction using a cryptocurrency wallet.

In some implementations, the reference location that has been assigned to the particular entity is determined (308). In some situations, the reference location can be included in the access request, and identified by a server that receives the access request. For example, the access request could include a geo identifier specifying a country of origin (e.g., citizen or residence) for the person submitting the access request. In these situations, the server receiving the access request can identify the reference location from the access request itself.

In some situations, the reference location can be determined based on stored data available to the server receiving the access request. For example, a global mapping of entity identifiers to geographic regions and/or assigned servers can be maintained and made available to servers that receive access requests. This global mapping can specify, for example, the geographic region access requests should be routed to for each different entity and/or the address of a specific server that maintains the relevant information (e.g., home geographic region) for the particular entity that submitted the access request. In this way, the server receiving the access request can either determine the geographic region to which the access request should be routed for processing and/or the server that should receive the access request to determine which server should process the access request.

The access request is routed based on the reference location (310). In some implementations, the access request is routed to a server (or another device) that is physically located in the reference location (e.g., home geographic region) for the entity that submitted the request.

Circumferential biometric data ("CBD") is obtained (312). In some implementations, the CBD is a representation of one or more physical attributes of a person depicted in an image that was captured by an image capture device. The image capture device can be associated with (e.g., in communication with) the device that submitted the access request. For example, the image capture device can be a camera on a mobile phone (or other computing device), a video sensor analyzing video captured at a location, or another image capture device.

The CBD can be generated and/or have a form similar to that of the CBT discussed above, and with reference to FIGS. 2A-2C. The CBD can be obtained in various ways depending on the implementation details. For example, in some implementations, the CBD can be included in the access request, such that the CBD can be obtained by identifying the CBD in the access request, and/or extracting the CBD from the access request. In other implementations, the access request includes an image of the entity that is requesting access, and the CBD are generated by the server that is processing the CBD, or generated by another server in communication with the server that is processing the CBD.

In some implementations, the CBD for a particular entity is generated based, in part, on distance measures of facial features of the particular entity. For example, the device determining the CBD can receive data specifying a distance measure between two points of a facial feature of the entity, and determine the circumference measure using the distance measure between two points of the facial feature, as discussed above with reference to the creation of the CBT, and with reference to FIGS. 2A-2C. This can be repeated for each facial feature, and the CBD can be the aggregation of encoded representations of the facial features generated using the circumference measures.

When the CBD is received with the access request, the CBD can be transmitted to, and processed by, one or more servers that are located in the reference location (e.g., home geographic region) of the particular entity, such that the particular entity's CBTs and/or other personal data can be maintained in their reference location, rather than be disseminated to servers and/or data stores in multiple jurisdictions. This can occur irrespective of, or independent of, where the particular entity is located when they submit the request to access the item. This helps facilitate compliance with data storage and handling requirements across jurisdictions.

In some implementations, the CBD are encoded in various ways so as to prevent unauthorized access to the CBD. For example, the CBD can be encoded using secret key cryptography such that the system receiving the CBD must have the secret key in order to access the CBD. The CBD can also be encoded in a manner that requires a challenge/puzzle to be solved before the CBD can be accessed by the receiving system. For example, the challenge can be a segmented version of the captured image of the entity (e.g., divided into squares), and the squares can be randomly rearranged, such that the resulting aggregate image is a scrambled version of the captured image of the entity. To gain access to the CBD, or to even gain access to the secret key encrypted version of the CBD, the receiving system can be required to correctly identify each segment of the image that includes a particular portion of the entity's face. For example, an artificial intelligence agent executing on the receiving system can be required to identify each square of the segmented image includes a portion of the entity's eye or mouth.

Alternatively, or additionally, the artificial intelligence agent can be required to identify each portion of the CBD that contains specified physical features and/or the corresponding values for that physical feature prior to gaining access to the CBD. For example, the artificial intelligence agent can be required to specify which portions of the CBD contain the left eye data, e.g., "LE_Data," and/or specify at least a portion of the "LE_Data" prior to gaining access to the "LE_Data." Failure to solve the challenge can result in the receiving system being prevented from accessing the CBD, or even attempting to decrypt the CBD using a key.

The artificial intelligence agent can be trained, for example, using the CBT that is stored for the particular entity. For example, the artificial intelligence agent can learn the locations of the various physical features, the distances between the physical features, and or other information about the physical features based on the multiple different CBTs that have been stored for the particular entity. This information can also be used to determine expected locations of specified physical features in images represented by received CBD when given limited information. For example, given the location and circumference measure of left eye, the artificial intelligence agent would be trained to output the relative location of the mouth, and the circumference measure of the mouth.

Authentication outcome data are generated (314). In some implementations, the authentication outcome data indicate whether the CBD matches the CBT of the particular entity corresponding to the identifier in the access request. When the authentication outcome data indicates a match between the CBD and the CBT of the particular entity, the entity requesting access is determined to be the particular entity. When the authentication outcome data indicates a lack of a match between the CBD and the CBT of the particular entity, the entity requesting access is determined to not be the particular entity. The authentication outcome data are described in more detail above, with reference to FIGS. 1 and 2A.

In some implementations, the generation of the authentication outcome data is based on a comparison of the CBD to the CBT that represents the particular entity. This comparison can be a feature by feature comparison, e.g., comparing the circumference measure and other characteristics of a node in the CBD representing a particular facial feature of the entity requesting access to the item to the circumference measure and other characteristic of a corresponding node in the CBT (e.g., a portion of the CBT) representing the particular facial feature of the particular entity. In these implementations, the authentication outcome data is generated to indicate a match (or lack of match) for each particular facial feature. In some situations, the comparison can be a similarity measure (or similar relative measure of match), and the authentication outcome data can specify the level of match between the CBD and the CBT.

Access to the item is controlled based on the generated authentication outcome data (316). In some implementations, the access is controlled by granting access to the item when the authentication outcome data indicates that the CBD matches the CBT of the particular entity, and denying access to the item when the authentication outcome data indicates that the CBD fails to match the CBT of the particular entity. For example, when a match fails to exist, the entity requesting access has not been authenticated (or validated) as actually being the particular entity they claim to be (e.g., based on the inclusion of the identifier for the particular entity being included in the access request).

In some implementations, granting access to the particular entity includes transmitting access approval data to a particular device securing the item. When the particular entity is located outside of their reference location, the approval access data can be transmitted by one or more servers that are located in the reference location of the particular entity. The access approval data causes the particular device to allow the particular entity to access the item. For example, the access approval data can cause a lock to unlock, a door to open, a garage door to open, a keypad to activate, a gate to open, or another appropriate action to be performed, thereby granting access to the particular entity. The access approval data can also cause a computing device to grant the particular entity with specified access to an application or other computing resource. For example, the access approval data can cause a mobile phone, tablet, digital assistant, or another computing device, to allow a person the ability to access a cryptocurrency wallet, and/or complete cryptocurrency transactions.

Additionally, or alternatively, when a match fails to be identified between the CBD of an unknown person (e.g., someone detected by a camera at a physical location) and CBTs of entities authorized to access the item (e.g., the physical location), access to the item can similarly be denied. Meanwhile, when a match is identified between the CBD of an unknown person (e.g., someone detected by a camera at a physical location) and CBTs of entities authorized to access the item (e.g., the physical location), access to the item can be granted. In some implementations, when the match is detected the unknown entity can be authenticated as the entity represented by the matched CBT, and access approval data can be generated and transmitted to a particular device securing the item. The access approval data can cause the particular device to allow the particular entity to access the item. For example, the access approval data can cause a lock to unlock, a door to open, a garage door to open, a keypad to activate, a gate to open, or another appropriate action to be performed, thereby granting access to the particular entity.

In some situations, access to the item is conditioned on an entry corresponding to the particular entity in the authority table. As discussed above, the authority table specifies, for each given entity among multiple different entities, a reference to the given entity and one or more of a level of access to a particular item that is assigned to the given entity, time periods during which the given entity is authorized to access the particular item, or limitations on access to the particular item. Thus, when an authority table is used, the access to the item is further controlled based on the conditions specified in the authority table. In other words, even if the identity of a person is authenticated, that person will not be granted access to the item unless the conditions in the authority table entry corresponding to that person and the item they are attempting to access indicate that access should be granted given the context of the request (e.g., time of request, type of access requested, etc.).

The CBD is evaluated as a candidate CBT for the particular entity (318). In some implementations, each CBD that is deemed to match one or more CBTs for the particular entity can be evaluated as a potential (i.e., candidate) CBT for processing further access requests. This continual evaluation of CBDs as candidate CBTs provides an ongoing quality improvement mechanism for the templates being used to verify the identity of people. For example, by continually evaluating newly obtained CBT for an entity, the system is able to identify the best templates to use for identifying that particular entity.

This evaluation can take into account a number of template quality indicators such, as a portion of false negatives generated by the template, a portion of false positives generated by the template, and a portion of true positives generated by the template. When a newly received set of CBD for a particular entity is more similar to a higher quality CBT than a lower quality CBT, the CBD can be used (or tested) as a candidate CBT for that particular entity. In some implementations, while the candidate CBT is being evaluated, it can be used to generate authentication outcome data that is not actually used, but is stored for purposes of comparison with the authentication outcome data of the CBTs being used to verify the identity of the particular entity.

The quality of the candidate CBT can be evaluated, for example, by comparing its authentication outcome data with that of the CBTs being used to verify the identity of the particular entity. For example, the portion of false positives (e.g., percentage of all classifications that incorrectly identified as entity as the particular entity) generated by the candidate CBT, the portion of false negatives (e.g., percentage of all classifications that incorrectly identified the particular entity as not being the particular entity), and/or the portion of true positives (e.g., percentage of all classifications that correctly identified the particular entity as the particular entity) can be used to create a quality score. This quality score can be compared to those of the CBTs being used, to determine whether the CBD (i.e., candidate CBT) qualifies as a CBT (320).

When the quality score of the candidate CBT is better (e.g., indicates higher quality) than at least one of the CBTs being used, the candidate CBT can be designated as a qualified CBT (e.g., a CBT qualified to be used to verify the identity of the particular entity). In some implementations, the newly designated qualified will replace one of the existing CBTs for the particular entity. In other implementations, the newly designated live CBT can be included in the set of CBTs used to verify the identity of the particular entity (e.g., without removing any existing CBTs). In either event, a CBT of the particular entity is generated (302), and the process 300 can repeat.

When the quality score of the candidate CBT is not better (e.g., indicates a lower quality) than all of the CBTs being used, the candidate CBT can be disqualified from consideration as a CBT, and a CBT is not generated using the CBD (322).

Figure 4:
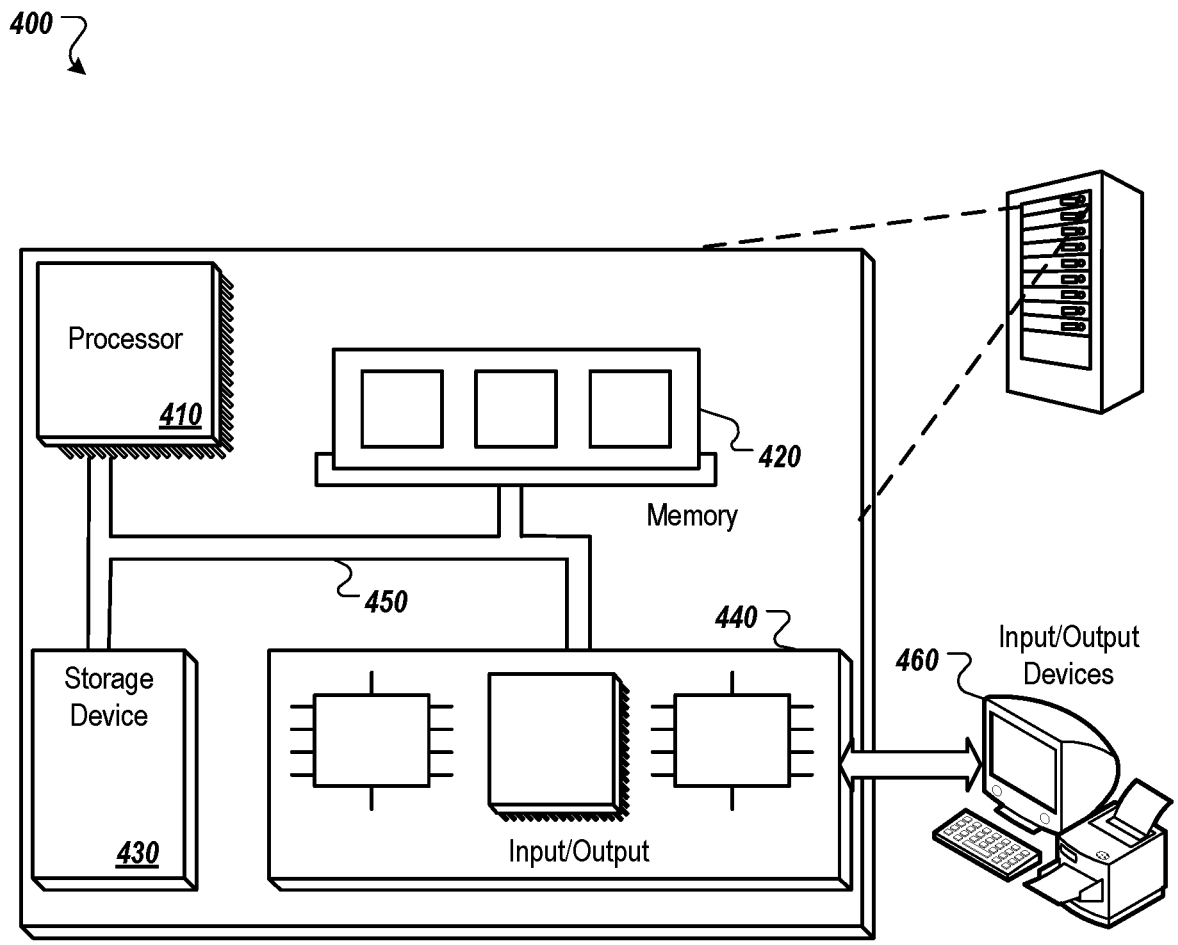
FIG. 4 is a block diagram of an example computing device.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:
   obtaining, by one or more computing devices, one or more images of a particular entity;
   determining, by the one or more computing devices, a distance measure between two points of a physical feature of the particular entity based on the one or more images of the particular entity;
   generating, by the one or more computing devices, a circumference measure of the physical feature based on the distance measure of the physical feature, wherein the circumference measure represents a distance around a circle having a diameter of the distance measure;
   generating, by the one or more computing devices, a circumferential biometric template (CBT) of a particular entity based on the circumference measure of the physical feature;
   storing, by the one or more servers computing devices and in a data structure, the CBT with a reference to the particular entity;
   after storing the CBT with the reference to the particular entity:
      receiving a request to access an item, wherein the request includes an identifier corresponding to the particular entity;
      obtaining circumferential biometric data (CBD) for one or more physical characteristics of an entity depicted in an image captured by an image capture device;
      obtaining authentication outcome data indicating whether the CBD matches the CBT stored with the reference to the particular entity; and
      controlling access to the item based on the obtained authentication outcome data, including:
         granting access to the item when the authentication outcome data indicates that the CBD matches the CBT of the particular entity; and
         denying access to the item when the authentication outcome data indicates that the CBD fails to match the CBT of the particular entity.

2. The method of claim 1, further comprising:
   determining a geographic region specified in an identification document submitted by the particular entity or based on a GPS location of the particular entity;
   assigning the determined geographic region as a reference location for the particular entity, wherein storing the CBT with the reference to the particular entity comprises storing the CBT with the reference to the particular entity in a device that is physically located within the reference location.

3. The method of claim 2, further comprising:
   in response receiving the request to access the item:
      determining the reference location that has been assigned to the particular entity; and
      transmitting the CBD for one or more physical characteristics of an entity depicted in an image captured by a camera, wherein the circumferential biometric data is transmitted to one or more servers that are located in the reference location independent of a location of the particular entity when the request to access the item is received.

4. The method of claim 3, wherein granting access to the item when the authentication outcome data indicates that the circumferential biometric data matches the CBT of the particular entity comprises transmitting, by the one or more servers located in the reference location, access approval data to a particular device securing the item, wherein the access approval data causes the particular device to allow the particular entity to access the item.

5. The method of claim 1, further comprising:
   in response to receiving the request to access the item, accessing a data structure that stores an authority table specifying, for each given entity among a plurality of entities, a reference to the given entity and one or more of a level of access to the item that is assigned to the given entity, time periods during which the given entity is authorized to access the item, or limitations on access to the item, wherein controlling access to the item based on the generated obtained authentication outcome data comprises conditioning access to the item on an entry in the authority table corresponding to the given entity.

6. The method of claim 1, wherein:
   receiving a request to access an item comprises receiving a request to access a cryptocurrency wallet; and
   controlling access to the item based on the obtained authentication outcome data comprises controlling access to the cryptocurrency wallet based on the obtained authentication outcome data.

7. The method of claim 1, further comprising:
   determining a center location of the physical feature, wherein:
      generating a circumferential biometric template comprises generating the circumferential biometric template based on the circumference measure and the center location of the physical feature;
      obtaining circumferential biometric data for one or more physical characteristics of an entity based on an image captured by a camera comprises:
         receiving data specifying a distance measure between two points of a facial feature of the entity and a center point of the facial feature; and
         determining a circumference measure using the distance measure between two points of the facial feature; and
      obtaining authentication outcome data indicating whether circumferential biometric data matches the CBT comprises:
         identifying the facial feature of the entity;
         comparing the circumferential biometric data to a portion of the CBT that represents the facial feature of the entity; and
         generating the authentication outcome data based on whether the comparison indicates a match between the circumferential biometric data and the portion of the CBT that represents the facial feature of the entity.

8. The method of claim 1, wherein generating a circumferential biometric template of a particular entity comprises:
   receiving two or more images of the particular entity;
   for each particular image among the two or more images:
      identifying multiple different facial features in the particular image;
      determining a circumference measure for each of the multiple different facial features; and
      encoding the circumference measures for each of the multiple different facial features to obfuscate the circumference measures; and storing the encoded circumference measures for each of the multiple different facial features together as a particular CBT for the particular entity.

9. The method of claim 8, further comprising:
generating an additional CBT based on a newly acquired image; and
adding the additional CBT to a set of previously stored CBTs, or replacing a previously stored CBT with the additional CBT, based on a level of match between the additional CBT and a given stored CBT exceeding the level of match between the previously stored CBT and the given stored CBT.

10. A non-transitory computer readable medium storing instructions that when executed by one or more computing devices, cause the one or more computing devices to perform operations comprising:
obtaining one or more images of a particular entity;
determining a distance measure between two points of a physical feature of the particular entity based on the one or more images of the particular entity;
generating a circumference measure of the physical feature based on the distance measure of the physical feature, wherein the circumference measure represents a distance around a circle having a diameter of the distance measure;
generating a circumferential biometric template (CBT) of a particular entity based on the circumference measure of the physical feature;
storing, in a data structure, the CBT with a reference to the particular entity;
after storing the CBT with the reference to the particular entity:
receiving a request to access an item, wherein the request includes an identifier corresponding to the particular entity;
obtaining circumferential biometric data (CBD) for one or more physical characteristics of an entity depicted in an image captured by an image capture device;
obtaining authentication outcome data indicating whether the CBD matches the CBT of the particular entity; and
controlling access to the item based on the obtained authentication outcome data, including:
granting access to the item when the authentication outcome data indicates that the CBD matches the CBT of the particular entity; and
denying access to the item when the authentication outcome data indicates that the CBD fails to match the CBT of the particular entity.

11. The non-transitory computer readable medium of claim 10, wherein the instructions cause the one or more computing devices to perform operations further comprising:
determining a geographic region specified in an identification document submitted by the particular entity or based on a GPS location of the particular entity;
assigning the determined geographic region as a reference location for the particular entity, wherein storing the CBT with the reference to the particular entity comprises storing the CBT with the reference to the particular entity in a device that is physically located within the reference location.

12. The non-transitory computer readable medium of claim 11, wherein the instructions cause the one or more computing devices to perform operations further comprising:
in response receiving the request to access the item:
determining the reference location that has been assigned to the particular entity; and
transmitting the CBD for one or more physical characteristics of an entity depicted in an image captured by a camera, wherein the circumferential biometric data is transmitted to one or more servers that are located in the reference location independent of a location of the particular entity when the request to access the item is received.

13. The non-transitory computer readable medium of claim 12, wherein granting access to the item when the authentication outcome data indicates that the circumferential biometric data matches the CBT of the particular entity comprises transmitting, by the one or more servers located in the reference location, access approval data to a particular device securing the item, wherein the access approval data causes the particular device to allow the particular entity to access the item.

14. The non-transitory computer readable medium of claim 10, wherein the instructions cause the one or more computing devices to perform operations further comprising:
in response to receiving the request to access the item, accessing a data structure that stores an authority table specifying, for each given entity among a plurality of entities, a reference to the given entity and one or more of a level of access to the item that is assigned to the given entity, time periods during which the given entity is authorized to access the item, or limitations on access to the item, wherein controlling access to the item based on the obtained authentication outcome data comprises conditioning access to the item on an entry in the authority table corresponding to the given entity.

15. The non-transitory computer readable medium of claim 10, wherein:
receiving a request to access an item comprises receiving a request to access a cryptocurrency wallet; and
controlling access to the item based on the obtained authentication outcome data comprises controlling access to the cryptocurrency wallet based on the obtained authentication outcome data.

16. The non-transitory computer readable medium of claim 10, wherein:
obtaining circumferential biometric data for one or more physical characteristics of an entity based on an image captured by a camera comprises:
receiving data specifying a distance measure between two points of a facial feature of the entity; and
determining a circumference measure using the distance measure between two points of the facial feature; and
generating authentication outcome data indicating whether circumferential biometric data matches the CBT comprises:
identifying the facial feature of the entity;
comparing the circumference measure to a portion of the CBT that represents the facial feature of the entity; and
obtaining the authentication outcome data based on whether the comparison indicates a match between the circumference measure and the portion of the CBT that represents the facial feature of the entity.

17. The non-transitory computer readable medium of claim 10, wherein generating a circumferential biometric template of a particular entity based on one or more images of the particular entity comprises:
receiving two or more images of the particular entity;

for each particular image among the two or more images:
  identifying multiple different facial features in the particular image;
  determining a circumference measure for each of the multiple different facial features; and
  encoding the circumference measures for each of the multiple different facial features to obfuscate the circumference measures; and
  storing the encoded circumference measures for each of the multiple different facial features together as a particular CBT for the particular entity.

18. The non-transitory computer readable medium of claim 17, wherein the instructions cause the one or more computing devices to perform operations further comprising:
  generating an additional CBT based on a newly acquired image; and
  adding the additional CBT to a set of previously stored CBTs, or replacing a previously stored CBT with the additional CBT, based on a level of match between the additional CBT and a given stored CBT exceeding the level of match between the previously stored CBT and the given stored CBT.

19. A system, comprising:
a data storage device storing instructions; and
one or more computing devices that interact with the data storage device and, upon execution of the instructions, perform operations comprising:
  obtaining one or more images of a particular entity;
  determining a distance measure between two points of a physical feature of the particular entity based on the one or more images of the particular entity;
  generating a circumference measure of the physical feature based on the distance measure of the physical feature, wherein the circumference measure represents a distance around a circle having a diameter of the distance measure;
  generating a circumferential biometric template (CBT) of a particular entity based on the circumference measure of the physical feature;
  storing, in a data structure, the CBT with a reference to the particular entity;
  after storing the CBT with the reference to the particular entity:
    receiving a request to access an item, wherein the request includes an identifier corresponding to the particular entity;
    obtaining circumferential biometric data (CBD) for one or more physical characteristics of an entity depicted in an image captured by an image capture device;
    obtaining authentication outcome data indicating whether the CBD matches the CBT of the particular entity; and
    controlling access to the item based on the obtained authentication outcome data, including:
      granting access to the item when the authentication outcome data indicates that the CBD matches the CBT of the particular entity; and
      denying access to the item when the authentication outcome data indicates that the CBD fails to match the CBT of the particular entity.

20. The system of claim 19, wherein the instructions cause the one or more computing devices to perform operations further comprising:
  determining a geographic region specified in an identification document submitted by the particular entity or based on a GPS location of the particular entity;
  assigning the determined geographic region as a reference location for the particular entity, wherein storing the CBT with the reference to the particular entity comprises storing the CBT with the reference to the particular entity in a device that is physically located within the reference location.

\* \* \* \* \*